United States Patent [19]

Phelps et al.

[11] Patent Number: 5,048,607
[45] Date of Patent: Sep. 17, 1991

[54] IN-SITU EMULSION POLYMERIZATION OF ETHYLENE DERIVATIVES

[75] Inventors: Craig H. Phelps, Bakersfield, Calif.; E. Thomas Strom; Mark L. Hoefner, both of Dallas, Tex.

[73] Assignee: Mobil Oil Corporation, Fairfax, Va.

[21] Appl. No.: 565,596

[22] Filed: Aug. 10, 1990

[51] Int. Cl.$^5$ .................. E21B 33/138; E21B 43/22
[52] U.S. Cl. ........................... 166/270; 166/273; 166/274; 166/281; 166/295; 523/130
[58] Field of Search ............ 166/281, 288, 270, 295, 166/300, 272, 273, 274; 523/130

[56] References Cited

U.S. PATENT DOCUMENTS

| | | |
|---|---|---|
| 2,402,588 | 6/1946 | Andresen . |
| 3,490,533 | 1/1970 | McLaughlin ................. 166/270 |
| 3,645,336 | 2/1972 | Young et al. ................. 166/288 |
| 3,805,893 | 4/1974 | Sarem ........................ 166/270 |
| 3,965,986 | 6/1976 | Christopher ................ 166/292 |
| 4,168,614 | 9/1979 | Rieuz ....................... 166/295 X |
| 4,458,760 | 7/1984 | Hurd ......................... 166/273 |
| 4,676,318 | 6/1987 | Myers et al. ................ 166/293 |
| 4,804,043 | 2/1989 | Shu et al. ................... 166/263 |
| 4,830,108 | 5/1989 | Hazlett et al. .............. 166/270 |
| 4,844,163 | 7/1989 | Hazlett et al. ............ 166/300 X |
| 4,951,921 | 8/1990 | Stahl et al. ............... 166/274 X |

*Primary Examiner*—George A. Suchfield
*Attorney, Agent, or Firm*—Alexander J. McKillop; Charles J. Speciale; Charles A. Malone

[57] ABSTRACT

A profile control method for closing off a more permeable zone of a formation where water, high fluid flow, or high perssures are encountered. A water-external emulsion containing a monomer, a cross-linker, free radical initiators and reaction inhibitors is injected into the formation. There they react to form plastic-like solid spheres in the more permeable formation zone. Because the spheres are not water soluble and have high compressive strength, they can be used in severe flow applications. Ethylene, propylene and styrene monomers can be utilized to form solid spheres of polyethylene, polypropylene or polystyrene.

24 Claims, 1 Drawing Sheet

IN-SITU EMULSION POLYMERIZATION OF ETHYLENE DERIVATIVES

FIELD OF THE INVENTION

This invention relates to a method for reducing permeability of a subterranean formation. Primarily it is for use in a formation where water, high fluid flow, or high pressures are encountered. More particularly, this invention relates to a method for blocking an area of a subterranean formation by the use of a plastic-like solid.

BACKGROUND OF THE INVENTION

Various methods have been proposed so that injected fluids can be diverted to uncontacted zones of a reservoir. One such method is disclosed in U.S. Pat. No. 2,402,588 issued to Andresen. This patent discloses a method of sealing a more permeable area of the reservoir by injecting into a reservoir a dilute alkaline solution of sodium silicate under low pressure. An acid gas such as carbon dioxide is then injected to reduce the alkalinity of the solution, resulting in gelling.

Another method is disclosed in U.S. Pat. No. 3,645,336 issued to Young et al. This patent teaches the plugging of a zone of a reservoir by injecting a mixture of steam and sodium silicate into the permeable zone. A second mixture containing steam and a gelling agent such as carbon dioxide is injected into the permeable zone, and the two mixtures are allowed to react. A hard silica gel plug is formed.

Yet another method is disclosed in U.S. Pat. No. 3,805,893 which issued to Sarem. Sarem discloses the formation of a gelatinous precipitate by injection of small slugs of dilute aqueous alkaline metal silicate solution, followed by water and then a dilute aqueous solution of a water soluble material which reacts with the alkali metal silicate to form a precipitate. The precipitate hardens to form a substantially impermeable substance.

U.S. Pat. No. 3,965,986 issued to Christopher discloses still another method. Here, a slug of fumed colloidal silica and water is injected into a reservoir. This slug has a relatively low viscosity. A surfactant is then injected which forms a gel on contact with the silica slug.

Meyers et al. disclosed a method for reducing the permeability of a subterranean formation in U.S. Pat. No. 4,676,318. Here, an alkali metal silicate was produced by injecting into the formation a solution of alkali metal silicate and a chemical surfactant, along with a non-condensible gas. The foam hardens into a substantially impermeable solid. The foam may be used to reduce permeability in areas of the formation which have been steam swept during steam stimulation cycles. Thus, subsequent steam stimulation cycles were directed to uncontacted areas of the formation.

Many of the materials proposed for profile control of injected or produced fluids have been polymer hydrogels. These gels are formed either in-situ or ex-situ by blending 100 to 10,000 ppm of a water soluble polymer with an appropriate cross-linker. These types of gels are advantageous in many situations because their dilute polymer concentration makes them relatively inexpensive. However, their water soluble nature and relatively low elastic limits may render them inappropriate for profile control in extremely high flow rate or high pressure applications such as a plugging of a hydraulically-induced fracture.

Therefore, what is needed is a water-external component system which will have a very high elastic limit or compressive strength so as to be able to resist high pressure and high fluid flow within a formation.

SUMMARY OF THE INVENTION

In the practice of this invention, an emulsion is directed into a more permeable zone of the formation. The emulsion comprises a polyethylene derivative with a cross-linker therein along with initiators and retarders which allows polymerization to take place in-situ. The polymerizable components form a water-external emulsion. Upon polymerization, the components react to form a plastic-like solid in a more permeable zone of the formation due to heat contained in the formation. Because the solid is not water-soluble and has high compressive strength, it can be used in severe flow and high pressure applications where fluids such as water are encountered. Because of a bimodal distribution of the plastic-like solid spheres, said spheres can be used to plug pore throats within a formation as well as a fracture within the formation. Ethylene derivatives cross-linked with an appropriate cross-linker form the plastic-like solid spheres. Monomers which can be utilized include ethylene, propylene, and styrene, which are polymerized in-situ to form plastic-like solids of polyethylene, polypropylene, or polystyrene. Fluids which can be diverted by these materials include water, carbon dioxide, hydrocarbon gases, gaseous nitrogen, steam, alkaline flooding agents, surfactants, foams, polymers, and acids.

It is therefore an object of this invention to provide for a water-external emulsion which can be used to form a plastic-like solid within a formation to preclude fluid entry by most fluids used in enhanced oil recovery methods.

It is another object of this invention to provide for a method whereby the formulation of a water-external emulsion can be modified and injected into a formation, thus allowing for variable propagation distances prior to forming a plastic-like solid.

It is yet another object of this invention to provide for the formation of a plastic-like solid material by polymerization in-situ at temperatures existing within a reservoir.

It is yet another object of this invention to polymerize ethylene derivatives in an oil-bearing formation so as to redirect fluids flowing at high pressures and high rates such as occur in some hydraulically-induced fractures.

DESCRIPTION OF THE PREFERRED EMBODIMENT

Figure 1:
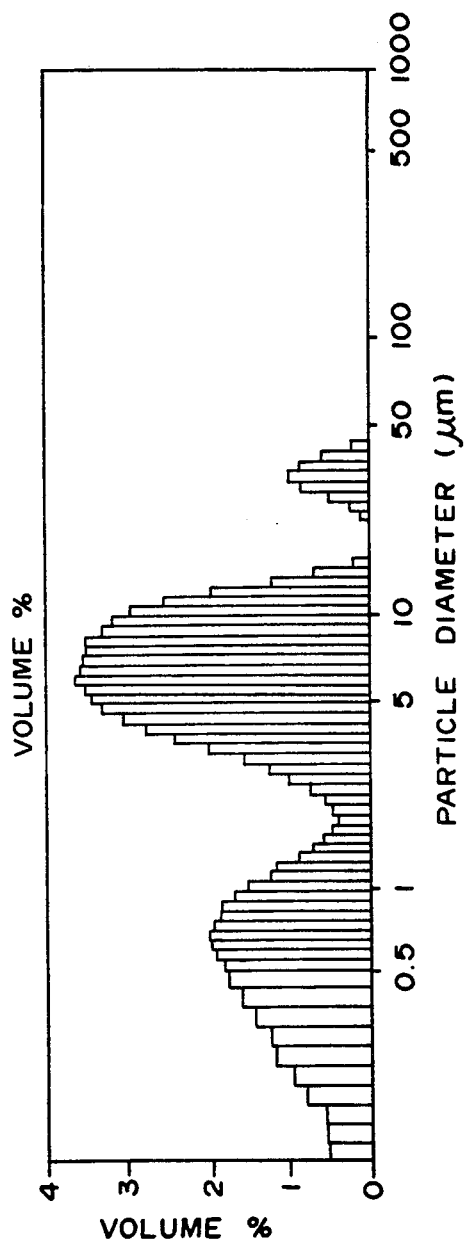
FIG. 1 is a graphical illustration of the particle size distribution of the polystyrene spheres.

In flooding operations, a fluid, usually water, is injected into the subterranean, oil-bearing formation through an injection well which extends from the surface of the earth down into a formation. A production well also extends into the formation at an offset or horizontal distance from the injection well so that, as the flooding liquid is injected into the formation through the injection well, it displaces the oil towards the production well. The oil is subsequently recovered from the production well. Once the oil has been displaced from a swept zone of the formation, an unswept zone may remain which contains additional oil. Often, more than one injection well and more than one production well will be used in order to cover the field adequately and maximize recovery. Various arrangements of injection and production wells are used to this end, e.g., linear arrangements to form a line drive, five spot, inverted five spot, seven spot, inverted seven spot, all of which are established in conventional practice.

To remove oil or hydrocarbonaceous fluids remaining in an unswept zone, a non-water soluble emulsion containing a monomer, a cross-linker, reaction initiators, and reaction inhibitors, is injected into a swept zone of the formation. After entering the formation, the monomer forms a plastic-like solid sphere upon cross-linking at temperatures existing in the formation through a polymerization process. Since the solid is not water soluble and has a high compressive strength, it can be used in severe flow and high pressure applications. Ethylene, propylene and styrene monomers can be utilized to form solids of polyethylene, polypropylene or polystyrene.

Prior to injecting the water-external or oil-in-water emulsion containing a monomer and a cross-linker, a prepad of sacrificial brine is pumped into the formation. The brine saturates at adsorption sites on rock surfaces so that a surfactant contained in the emulsion will not be adsorbed. Pumping action during the injection of the emulsion into the formation provides the necessary agitation which keeps the emulsion stable while the polymerization process takes place. The water-external emulsion is formed above ground under batch-wise conditions.

The emulsion which is formed can be tailored to fit varying formation conditions so as to be properly utilized to resist the flow of various types of fluids, i.e., steam, hydrocarbons, water, carbon dioxide, alkaline flooding agents, nitrogen gas, surfactants, foam, acids or polymers. As will be apparent to those skilled in the art, other fluids commonly used in enhanced oil recovery can be utilized herein.

When pumping the emulsion into the formation, it is desired to have a pressure and agitation rate sufficiently high to keep the emulsion properly suspended until polymerization can occur. It is desirable in many cases that the fracturing pressure of the formation or reservoir should not be exceeded during injection. A process for the selective placement of polymer gels for profile control in thermal oil recovery is discussed in U.S. Pat. No. 4,804,043 which issued to Shu et al. on Feb. 14, 1989. This patent is hereby incorporated by reference herein.

Although other ethylene derivatives have been mentioned, the preferred monomer for utilization herein is styrene. Styrene and divinylbenzene are emulsified with the surfactant so that the reaction can be carried out in those formations where water is encountered. The emulsion proceeds into the formation at temperatures existing therein after being injected into the formation. Once polymerization has occurred at the temperatures existing in the formation, plastic-like solid spheres are formed, thereby blocking pores and any existing fractures within a more permeable zone of the formation.

Although styrene is the preferred monomer, this process can be tailored to fit varying formation conditions, depending upon the nature of the fluids encountered, e.g., steam, hydrocarbons, water, carbon dioxide, alkaline flooding agents, nitrogen gas, surfactants, foam, acids or polymers. Should it be necessary to withstand higher temperatures, then polyethylene derivatives such as poly-3-methyl-1-butene, poly-4,4-dimethyl-1-butene, poly-ortho-methylstyrene, or poly-4,4-dimethyl-1-pentene may be substituted. These polyethylene derivatives have a melting point of 310° C., 350° C., 360° C., or 380° C. respectively. If milder conditions are encountered, then other polyethylene derivatives may be used as will be recognized by those skilled in the art.

Flexibility to vary placement of the water-external emulsion within the formation before polymerization takes place is obtained by adding a polymerization retarder such as, for example, potassium ferricyanide. By varying the ratio of a free radical initiator to a retarder, the timing of the polymerization reaction can be controlled, as well as the distance to which the emulsion may travel before forming plastic-like solid spheres. The following example illustrates how the polymerization reaction works.

EXAMPLE

A solution is made up of 2.5 grams of sodium dodecylsulfate, a surfactant. It is placed into 90 grams of water within a 250 ml beaker. The solution is purged with nitrogen for 15 minutes. Thereafter, 0.4 grams of sodium persulfate, a free radical initiator, is added into 10 grams of water. Next, 40 grams of styrene and 10 grams of divinylbenzene are added into the water. The mixture is stirred and purged with nitrogen for 5 minutes more. Stirring is continued and the temperature is raised to 65° C. In about an hour, a yellow emulsion is formed. The solution is stirred for 4 more hours. Afterwards, stirring is stopped. After the stirring is stopped, the solution displayed a creamy color resultant from the polystyrene spheres.

Figure 2:
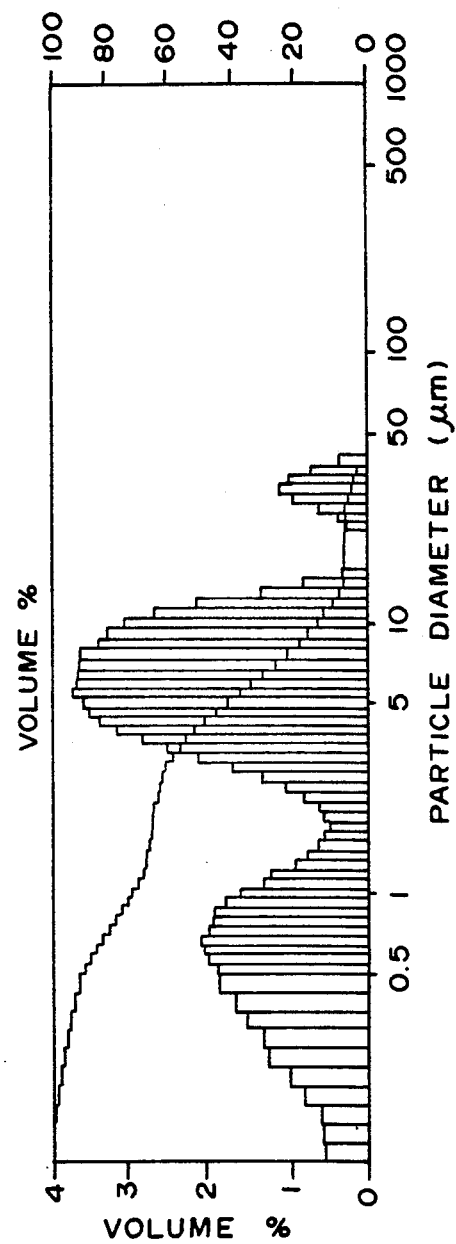
FIG. 2 is a graphical illustration of the particle size distribution of the polystyrene spheres and the cumulative volume percent for the various particle sizes.

An analysis of particle size distribution was made with a Coulter counter. This analysis showed a substantially bimodal distribution of polystyrene spheres with a small amount of a third population in the 25-40 micron range. This distribution is further amplified in the drawings, FIGS. 1 and 2.

The bulk of the spheres were in the 0.1-1 micron and 5-10 micron ranges. The smallest spheres are capable of plugging pore throats while the larger spheres are capable of plugging pores and fractures. Polystyrene has a melting point of 240° C., while the cross-linked polystyrene which was formed has an even higher melting point. The cross-linked polystyrene system is capable of resisting steam fluid flow.

The emulsion mentioned herein can be utilized prior to commencing a carbon dioxide flood during profile control. A carbon dioxide profile control method is mentioned in U.S. Pat. No. 4,830,108 which issued to Hazlett et al. on May 16, 1989. A waterflood method which can be used herein is disclosed in U.S. Pat. No. 4,458,760 which issued to Hurd. Both patents are hereby incorporated by reference herein. Although the high or more permeable zone of a formation has been closed by the plastic-like solid spheres, hydrocarbonaceous fluids still remain in an area of lesser permeability. After closing the zone of greater permeability, any of the above mentioned enhanced oil recovery methods, as well as others, can be used to remove hydrocarbonaceous fluids from the zone of lesser permeability.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed:

1. A method for profile control in a subterranean hydrocarbonaceous fluid-containing formation or reservoir where substantially high flow rates or high pressures are encountered comprising:
   a) injecting into a more permeable zone of said formation a water-external emulsion which contains an ethylene monomer derivative and a cross-linker in an amount sufficient to form plastic-like solid spheres; and
   b) allowing said emulsion to remain in the more permeable zone for a time sufficient to form in-situ plastic-like solid spheres by polymerization therein which spheres are sufficient to divert fluids utilized in enhanced oil recovery operations from said zone where high flow rates and high pressures are encountered.

2. The method as recited in claim 1 where the ethylene derivative comprises styrene and the cross-linker comprises divinylbenzene.

3. The method as recited in claim 1 where a surfactant, a free radical initiator, and a retarder are utilized.

4. The method as recited in claim 1 where fluids precluded from entry into said more permeable zone of a formation include steam, hydrocarbons, water, carbon dioxide, alkaline flooding agents, nitrogen gas, surfactants, foam, acids, or polymers.

5. The method as recited in claim 1 where the ethylene derivative comprises poly-3-methyl-1-butene, poly-4,4-dimethyl-1-butene, poly-ortho-methylstyrene, or poly-4,4-dimethyl-1-pentene and mixtures thereof.

6. The method as recited in claim 1 where the ethylene derivative comprises ethylene, propylene, and styrene monomers which subsequently form solids of polyethylene, polypropylene, or polystyrene.

7. The method as recited in claim 1 where a substantially bimodal distribution of plastic-like solid spheres is obtained upon polymerization within said formation.

8. The method as recited in claim 1 where polymerization is controlled by varying a ratio of free radical initiator to retarder contained in the emulsion which controls the distance at which the spheres are formed in said formation.

9. The method as recited in claim 1 where a substantially bimodal distribution of spheres is obtained wherein smaller spheres are capable of plugging pore throats in a formation while larger spheres will plug pores and fractures within a formation.

10. The method as recited in claim 1 where injection of the emulsion is accompanied by a pumping action which provides agitation that keeps said emulsion stable while polymerization takes place.

11. The method as recited in claim 1 where a carbon dioxide or waterflood enhanced oil recovery method is used to remove hydrocarbonaceous fluids from a zone of lesser permeability after step b).

12. The method as recited in claim 1 where in step a) the fracturing pressure of the formation is not exceeded when said emulsion is injected into the more permeable zone.

13. A method for profile control in a subterranean hydrocarbonaceous fluid-containing formation or reservoir where substantially high flow rates or high pressures are encountered comprising:
   a) injecting a prepad of sacrificial brine into a more permeable zone of said formation so that a surfactant contained in a water-external emulsion will not be absorbed on rock surfaces in said permeable zone;
   b) injecting via a pumping action the water-external emulsion which additionally contains an ethylene monomer derivative and a cross-linker in an amount sufficient to form plastic-like solid spheres; and
   c) allowing said emulsion to remain in the more permeable zone for a time sufficient to form in-situ plastic-like solid spheres by polymerization therein which spheres are sufficient to divert fluids utilized in enhanced oil recovery operations from said zone where high flow rates and high pressures are encountered.

14. The method as recited in claim 13 where the ethylene derivative comprises styrene and the cross-linker comprises divinylbenzene.

15. The method as recited in claim 13 where a free radical initiator and a retarder are utilized.

16. The method as recited in claim 13 where fluids precluded from entry into said more permeable zone of a formation include steam, hydrocarbons, water, carbon dioxide, alkaline flooding agents, nitrogen gas, surfactants, foam, acids, or polymers.

17. The method as recited in claim 13 where the ethylene derivative comprises poly-3-methyl-1-butene, poly-4,4-dimethyl-1-butene, poly-ortho-methylstyrene, or poly-4,4-dimethyl-1-pentene and mixtures thereof.

18. The method as recited in claim 13 where the ethylene derivative comprises ethylene, propylene, and styrene monomers which subsequently form solids of polyethylene, polypropylene, or polystyrene.

19. The method as recited in claim 13 where a substantially bimodal distribution of plastic-like solid spheres is obtained upon polymerization within said formation.

20. The method as recited in claim 13 where polymerization is controlled by varying a ratio of free radical initiator to retarder contained in the emulsion which controls the distance at which the spheres are formed in said formation.

21. The method as recited in claim 13 where a substantially bimodal distribution of spheres is obtained wherein smaller spheres are capable of plugging pore throats in a formation while larger spheres will plug pores and fractures within a formation.

22. The method as recited in claim 13 where said pumping action provides agitation that keeps said emulsion stable while polymerization takes place.

23. The method as recited in claim 13 where a carbon dioxide or waterflood enhanced oil recovery method is used to remove hydrocarbonaceous fluids from a zone of lesser permeability after step c).

24. The method as recited in claim 13 where in step b) the fracturing pressure of the formation is not exceeded when said emulsion is injected into the more permeable zone.

* * * * *